United States Patent [19]

Grobbelaar

[11] 3,899,132
[45] Aug. 12, 1975

[54] IRRIGATION APPARATUS
[76] Inventor: Christian Grobbelaar, 461 Queen's Crescent,, Pretoria, Transvaal Province, South Africa
[22] Filed: July 10, 1974
[21] Appl. No.: 487,021

[52] U.S. Cl. ............... 239/199; 137/355.16; 242/86
[51] Int. Cl.² ......................................... B65H 75/34
[58] Field of Search ................... 239/195, 197–199, 239/225, 264; 137/355.12, 355.16, 355.2, 355.22; 242/86–86.4; 222/173, 176–178

[56] References Cited
UNITED STATES PATENTS
588,897    8/1897    Casselman .................... 239/199 UX
3,472,456  10/1969   Strong ............................ 239/198 X Primary Examiner—M. Henson Wood, Jr.
Assistant Examiner—Andres Kashnikow
Attorney, Agent, or Firm—Karl W. Flocks

[57] ABSTRACT

Irrigation apparatus comprising an elongated flexible irrigation conduit having sprinkler devices at spaced intervals along its length, each sprinkler device comprising a sprinkler pipe having a nozzle at its free end, and having a lateral and longitudinal support arrangement associated with each sprinkler device to support the conduit in its operative position, and a storage reel adapted to have the conduit rolled up thereon with the sprinkler devices extending radially inwardly, the reel having locating means for locating the sprinkler devices within the reel.

10 Claims, 6 Drawing Figures

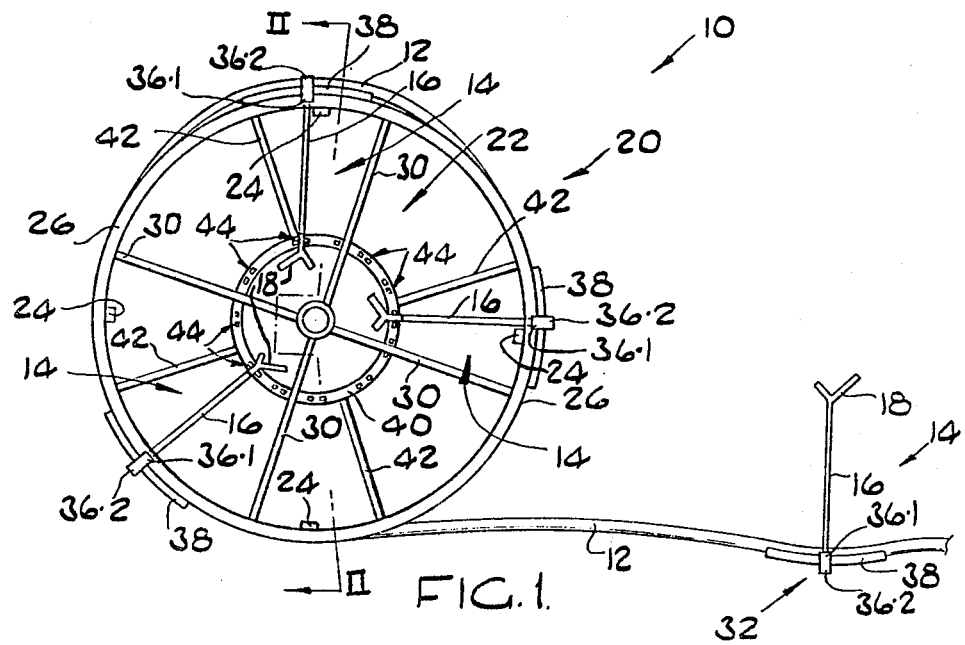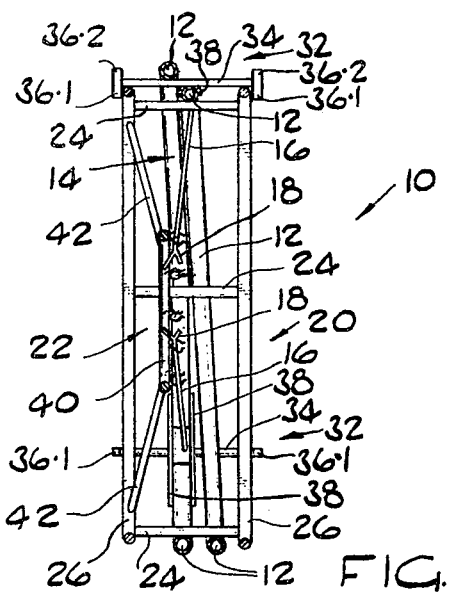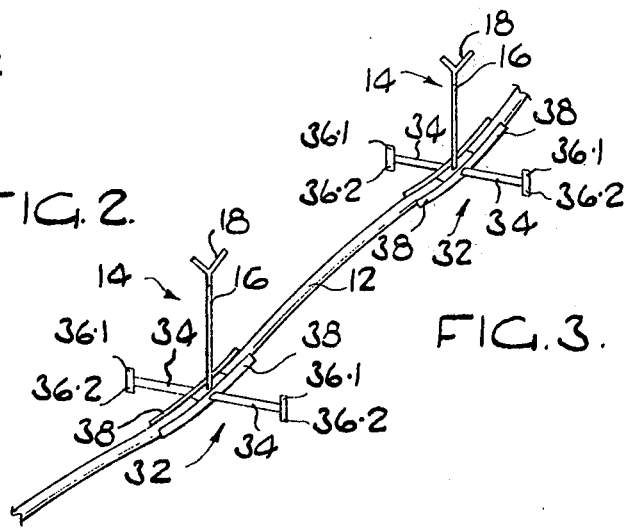

IRRIGATION APPARATUS

FIELD OF INVENTION

This invention relates to irrigation apparatus. More particularly, this invention relates to an elongated flexible irrigation conduit, storage means for storing such a conduit, and irrigation apparatus.

SUMMARY OF INVENTION

According to the invention there is provided an elongated flexible irrigation conduit having sprinkler means at spaced intervals along its length, and having lateral support means in the proximity of each sprinkler means to support the conduit in its operative position on the ground during use with the sprinkler means extending upwardly therefrom, each lateral support means comprising a pair of arms extending outwardly from opposed sides of the conduit, with each arm having opposed upper and lower shoulder formations extending from its free end portion, with each shoulder formation extending transversely to the longitudinal axis of both the arm and the portion of the conduit from which the arm extends.

The upper shoulder formations may conveniently be adapted to extend upwardly when the lateral support means is supporting the conduit in its operative position on a surface, and may extend normally to both the longitudinal axis of the arm and the portion of the conduit from which the arm extends. The lower shoulder formations may conveniently be directly opposed to and may extend in the directly opposed direction to the upper shoulder formations.

The upper shoulder formations may be adapted to locate the conduit on the periphery of a storage reel, when the conduit is rolled up onto a reel. In the same way, the lower shoulder formations may be adapted to locate successive coils of the conduit in position on the reel, when the conduit is rolled onto the periphery of a storage reel.

The lateral support means may, if desired, be connected to or form part of the sprinkler means.

The irrigation conduit may have longitudinal support means at spaced intervals along its length to support the conduit longitudinally during use.

The longitudinal support means may conveniently form part of or be connected to the lateral support means.

In an embodiment of the invention, each longitudinal support means may be curved about an axis of curvature extending substantially parallel to the longitudinal axis of the lateral support means. The purpose of having the longitudinal support means curved, is to ensure that when the conduit is wound onto a storage reel, the tendency for the conduit to bend at the ends of each longitudinal support means, will be reduced. The longitudinal support means may therefore have a degree of curvature corresponding generally to the curved periphery of a storage reel onto which the conduit is intended to be wound for storage purposes.

In an alternative embodiment of the invention, instead of each longitudinal support means being curved, each longitudinal support means may comprise two support members which extend at an obtuse angle to each other.

The sprinkler means may be of any suitable type. Thus, for example, the sprinkler means may be in the form of a spray nozzle, a pivotable sprinkler nozzle, or the like.

The sprinkler means may further be of the type where the nozzle is adjacent the conduit, or where the nozzle is spaced from the conduit by having a sprinkler pipe interposed between the nozzle and the conduit.

The conduit may be of any suitable material. It may conveniently, for example, be of a suitable synthetic plastic material, reinforced synthetic rubber, or the like. where it is of plastic it may, for example, be of P.V.C.

Further according to the invention, there is provided storage means for storing an elongated flexible irrigation conduit having sprinkler means in the form of sprinkler pipes with nozzles at their free ends, at spaced intervals along its length, and comprising a storage reel having a peripheral zone for receiving the conduit in a rolled up condition, having an internal receiving zone for receiving the sprinkler means extending radially inwardly from the conduit when rolled up on the reel, and having locating means within the receiving zone for locating the sprinkler means in position therein.

The locating means may be of any suitable type. Thus, for example, the locating means may comprise one or more pairs of jaw members which are displaceable relatively to each other between open and closed positions. Thus the jaw members can be displaced into their open position, the conduit can be wound onto the storage reel with the sprinkler means extending radially inwardly, and the jaw members can then be displaced into their closed position to locate the sprinkler means in position.

In an alternative embodiment of the invention, the locating means may comprise a plurality of clip members, with each clip member being adapted to receive a sprinkler pipe, and having a displaceable catch member to locate a sprinkler pipe therein.

The storage reel may be adapted to be rotated about its axis to roll a conduit onto the reel, or to unroll a conduit from the reel. The reel may therefore be rotatably mounted on a stand, or may be adapted to be rolled along a surface to roll a conduit onto the reel, or unroll a conduit from the reel.

Where the reel is mounted on a stand, the stand may be provided with wheel means to allow it to be displaced.

Further according to the invention, there is provided irrigation apparatus comprising an elongated flexible irrigation conduit having sprinkler means at spaced intervals along its length, each sprinkler means comprising a sprinkler pipe having a nozzle at its free end, and storage means comprising a reel adapted to have the conduit rolled up thereon with the sprinkler means extending radially inwardly, the reel having locating means for locating the sprinkler means within the reel.

The reel may comprise two side members which are laterally spaced to define a peripheral zone between them for receiving the conduit in a rolled up condition.

The conduit may have lateral support means in the proximity of each sprinkler means to support the conduit in its operative position during use with the sprinkler means extending upwardly therefrom, each lateral support means comprising a pair of arms extending outwardly from opposed sides of the conduit.

The side members of the reel may have peripheral rims, and the lateral support means may have locating formations for locating them on the peripheral rims when the conduit is rolled up onto the reel.

In an embodiment of the invention, the locating formations may be provided by the arms having upper shoulder formations projecting upwardly from the free end portions of the arms when they are supporting the conduit on a surface in its operative position.

The arms may further have lower shoulder formations which are opposed to and are directed in the opposed direction to the upper shoulder formations, for locating successive coils of the conduit in position on the storage means when the conduit is wound onto the storage means.

The conduit may further, as hereinbefore described, have longitudinal support means at spaced intervals along its length to support the conduit longitudinally during use.

The locating means may be in the form of locating means as hereinbefore described.

The spacing between adjacent sprinkler means on the conduit may be arranged in relation to the circumference of the storage reel, that the sprinkler means do not coincide on the reel when the conduit is rolled onto the reel.

BRIEF DESCRIPTION OF THE DRAWINGS.

Embodiments of the invention are now described by way of example with reference to the accompanying drawings.

In the drawings:

FIG. 1 shows a diagrammatic, fragmentary side elevation of irrigation apparatus;

FIG. 2 shows a fragmentary sectional end elevation of the apparatus of FIG. 1 along line II-II in FIG. 1;

FIG. 3 shows a fragmentary three-dimensional view of an irrigation conduit forming part of the irrigation apparatus of FIGS. 1 and 2;

Figure 4:
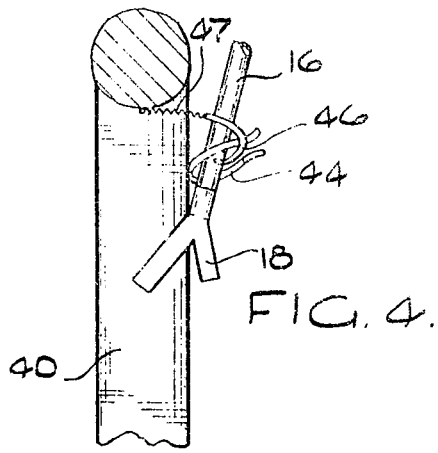
FIG. 4 shows a fragmentary three-dimensional detailed view to an enlarged scale, of the locating means of the apparatus of FIGS. 1 and 2.

DESCRIPTION OF PREFERRED EMBODIMENTS.

With reference to FIGS. 1 to 4 of the drawings, reference numeral 10 refers generally to irrigation apparatus comprising an elongated flexible irrigation conduit 12 having sprinkler means 14 at spaced intervals along its length, each sprinkler means 14 comprising a sprinkler pipe 16 having a sprinkler nozzle 18 of the rotatable type, mounted at its free end, and storage means comprising a reel 20 adapted to have the conduit 12 rolled up thereon as shown in FIGS. 1 and 2 of the drawings, with the sprinkler means 14 extending radially inwardly, the reel 20 having locating means 22 for locating the sprinkler means 14 within the reel 20.

The reel 20 comprises two side members which are laterally spaced by means of spacer bars 24 to define a peripheral zone for receiving the conduit 12 in a rolled up condition.

Each side member of the reel 20, comprises an annular rim 26 which is supported on an axle 28 on radially extending spokes 30. For the sake of clarity the radial spokes 30 have not been shown in FIG. 2 of the drawings.

The conduit 12 has lateral support means 32 associated with each sprinkler means 14, to support the conduit 12 in its operative position during use (as shown in FIGS. 1 and 3 of the drawings), with the sprinkler means 14 extending upwardly therefrom.

Each lateral support means 32 comprises a pair of arms 34 extending outwardly from opposed sides of the conduit 12.

The lateral support means 32 have locating formations for locating them on the annular rims 26 of the side members of the reel 20, when the conduit 12 is wound onto the reel 20.

The locating formations are provided by the arms 34 having upper shoulder formations 36.1 which project upwardly from the free end portions of the arms 34 when they are supporting the conduit 12 on a surface in its operative position.

Each upper shoulder formation 36.1 extends normally to the longitudinal axis of its arm 34, and extends normally to the longitudinal axis of that portion of the irrigation conduit 12 from which its arm 34 extends.

As can be seen in particular in FIG. 2 of the drawings therefore, the arms 34 of each pair are sufficiently long so that they will project beyond the side members of the reel 20 when the conduit 12 is wound onto the reel 20. The upper shoulder formations 36.1 will then locate the lateral support means 32 on the periphery of the reel 20, and combat the tendency for the lateral support means 32 to slide sidewardly off the reel 20.

Each arm 34 further has a lower shoulder formation 36.2 which is opposed to and directed in the opposed direction to the upper shoulder formation 36.1 of that arm 34, for locating successive coils of the conduit 12 in position on the reel 20 when the conduit is wound onto the reel 20. This can be seen particularly in FIG. 2 of the drawings where the portion of the conduit 12 shown constituting the outer coil, can be seen passing around the lateral support means 34 in question.

The conduit 12 further has longitudinal support means 38 at spaced intervals along its length to support the conduit 12 longitudinally during use. The longitudinal support means 38 is integrally connected to the lateral support means 34.

Each longitudinal support means 38 is curved with an axis of curvature extending generally parallel to the longitudinal axis of the lateral support means 32 associated with that longitudinal support means 38. The degree of curvature is such that it will tend to correspond generally with the curvature of the annular rim 26. Thus, when the conduit 12 is wound onto the reel 20, the tendency for the conduit 12 to bend sharply at the ends of the longitudinal support means 38, will tend to be combatted.

The locating means 22 comprises an annular ring 40 which is mounted within the reel 20 by means of spokes 42.

The annular ring has, mounted thereon, a multiplicity of substantially V-shaped clip members 44, with each clip member being adapted to have a sprinkler pipe 16 forced into it, and having a displaceable catch 46 to locate the sprinkler pipe 16 within the clip member 44.

This can be seen particularly in the detailed view comprising FIG. 4.

In FIG. 4 of the drawings, a sprinkler pipe 16 is shown forced into the V-shaped clip member 44 which is mounted on the annular ring 40. The sprinkler pipe 16 is located within the clip member 44 by the catch 46 which engages the pipe 16 and is maintained in position by the spring 47 which mounts the catch 46 onto the annular ring 40.

Thus, in use, when the conduit 12 is wound onto the reel 20, the sprinkler means 14 will extend radially inwardly as shown in FIGS. 1 and 2 of the drawings. Each sprinkler means 14 can then be displaced sidewardly towards the annular ring 40 and into one of the clip members 44, whereafter it can be located in position by displacing the catch 46 appropriately.

The locating means 22 ensures that the nozzles 18 do not bang against each other or against parts of the reel 20 during displacement of the reel 20, thereby avoiding damage to the nozzles 18.

In use therefore, one end of the conduit 12 can be connected to the reel 20, and the reel 20 can then be rolled along the conduit 12 to wind the conduit 12 onto the reel 20.

As the reel 20 is rolled along the conduit 12, each sprinkler means 14 will enter the reel 20 between the side members thereof, and will thus extend radially inwardly and be directed towards the axle 28.

The first coil of the conduit 12 which is wound onto the reel 20, will be supported on the reel 20 by the spacer bars 24 and by any lateral support means 32 in that first coil of the conduit 12, which bear against and are located on the annular rims 26. Subsequent coils of the conduit 12 on the reel 20, will be supported by the spacer bars 24 and also by any lateral support means 32 associated with portions of the conduit 12 which have already been wound onto the reel 20 and have thus already been located on the annular rims 26.

The tendency for successive coils of the conduit 12 to slide sidewardly off the reel 20, will thus be combatted by the lower shoulders 36.2 of the arms 34.

The spacing between adjacent sprinkler means 14 along the conduit 12, is arranged in relation to the circumference of the reel 20, that the sprinkler means 14 will not tend to coincide when the conduit 12 is wound onto the reel 20.

When the conduit 12 has been wound onto the reel 20, the various sprinkler means 14 can be located in position within the reel 20. Thereafter the reel 20 can be displaced to a desired point, the free end of the conduit 12 can be connected to the delivery outlet of a delivery pipe, and the reel can then be displaced to unroll the conduit 12 from the reel. The lateral support means 32 will tend to cause the sprinkler means 14 to be directed vertically upwardly as the conduit 12 is unrolled from the reel 20, thereby positioning the sprinkler means 14 appropriately for use. The longitudinal support means 38 will also tend to ensure that the sprinkler means 14 project upwardly and are thus ready for use.

In one application of the invenion, by way of example, a delivery pipe having delivery outlets at suitable intervals along its length, may be located on or adjacent an area to be irrigated. Thereafter the free end of the conduit 12 can be connected to a first delivery outlet, the conduit 12 can be unrolled from the reel 20 by rolling the reel 20 away from the delivery outlet, and a first zone can then be irrigated by the sprinkler means 14. Thereafter the conduit 12 can be rolled onto the reel 20, the reel 20 can be displaced to a second delivery outlet, the free end of the conduit 12 can be connected to the second delivery outlet, and the conduit 12 can then again be unrolled for irrigating a second zone, and so on.

It will be appreciated that if the annular rims 26 and spacer bars 24 are sufficiently strong, the axle 28 and, if desired, the spokes 30 may be omitted.

Figure 5:
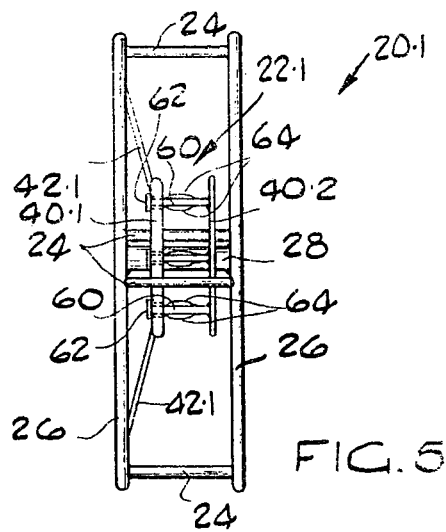
FIG. 5 shows an end elevation of a storage reel having an alternative form of locating means to that shown in FIGS. 1, 2 and 4 of the drawings.

With reference to FIG. 5 of the drawings, reference numeral 20.1 refers generally to a storage reel which corresponds with the storage reel of FIGS. 1 and 2, except that the locating means 22.1 is an alternative embodiment to the locating means 22 of FIGS. 1 and 2. Like parts of the storage reel 20.1 to those of the storage reel 20, are indicated by like reference numerals.

The locating means 22.1 comprises a pair of jaw members in the form of an annular ring 40.1 and a displaceable annular ring 40.2.

The ring 40.1 is mounted on spokes 42.1.

The ring 40.2 is displaceable relatively to the ring 40.1 by having guide members 60 extending slidably through bores in the ring 40.1.

Each guide member 60 has an enlarged head 62 to prevent it from being withdrawn from its bore in the ring 40.1.

Each guide member 60 further has spring biassed catches 64 which locate the rings 40.1 and 40.2 in their open position as shown in FIG. 5.

In their open position, a conduit 12 can be rolled onto the reel 20.1 as hereinbefore described, with the sprinkler means 14 extending radially inwardly between the rings 40.1 and 40.2.

The sprinkler means 14 can then be located in position by displacing the ring 40.2 towards the ring 40.1 and into its closed position.

During displacement of the ring 40.2 towards the ring 40.1, the catches 64 will be compressed onto the guide members 60, thereby allowing them to pass through the bores in the ring 40.1. Once they have passed through these bores, they will return to their expanded position thereby maintaining the rings 40.1 and 40.2 in their closed position.

Figure 6:
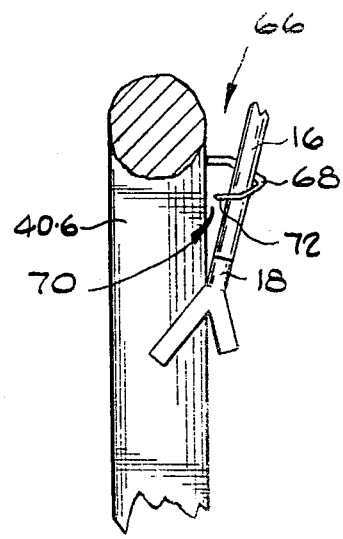
FIG. 6 shows a fragmentary three-dimensional detailed view similar to that of FIG. 4, with an alternative form of locating means.

With reference to FIG. 6 of the drawings, reference numeral 66 refers generally to a form of locating means which is alternative to the locating means 22 as illustrated in FIGS. 1 to 4 of the drawings.

The locating means 66 comprises an annular ring 40.6 which corresponds with the annular ring 40 and is mounted in exactly the same way as the annular ring 40.

However, instead of the V-shaped clip members 44 and catches 46, the ring 4.6 has a 40.6 of hook members 68 mounted thereon (only one being illustrated in FIG. 6).

Each hook member 68 defines a throat 70 between its free end 72 and the ring 40.6, through which the sprinkler pipe 16 can be forced. Since the lateral support means 32 tends to locate the conduit 12 centrally between the rims 26, and since the ring 40.6 is laterally spaced from the central zone between the rims 26, the pipes 16 will tend to remain within the hook members 68 during use.

It is an advantage of the embodiment of the invention as illustrated in the drawings, that irrigation apparatus is provided which can readily be moved thereby reducing the normal labour costs involved in dismantling and connecting the usual types of irrigation conduits. The irrigation apparatus as illustrated in the drawings, will also tend to be less costly than the usual type of permanent irrigation installations.

I claim:

1. Storage means for storing an elongated flexible irrigation conduit having sprinkler means in the form of sprinkler pipes with nozzles at their free ends, at spaced intervals along it length, and comprising a storage reel having a peripheral zone for receiving the conduit in a rolled up condition, having an internal receiving zone for receiving the sprinkler means extending radially inwardly from the conduit when rolled up on the reel, and having locating means within the receiving zone for locating the sprinkler means in position therein.

2. Storage means according to claim 1, in which the locating means comprises a plurality of clip members, with each clip member being adapted to receive a sprinkler pipe, and having a displaceable catch member to locate a sprinkler pipe therein.

3. Storage means according to claim 1, in which the locating means comprises a pair of opposed jaw members adapted to be displaced between an open position and a closed position to locate the sprinkler means between them.

4. Irrigation apparatus comprising an elongated flexible irrigation conduit having sprinkler means at spaced intervals along its length, each sprinkler means comprising a sprinkler pipe having a nozzle at its free end, and storage means comprising a reel adapted to have the conduit rolled up thereon with the sprinkler means extending radially inwardly, the reel having locating means for locating the sprinkler means within the reel.

5. Irrigation apparatus according to claim 4, in which the reel comprises two side members which are laterally spaced to define a peripheral zone for receiving the conduit in a rolled up condition.

6. Irrigation apparatus according to claim 5, in which the conduit has lateral support means in the proximity of each sprinkler means, to support the conduit in its operative position on the ground during use with the sprinkler means extending upwardly therefrom, each lateral support means comprising a pair of arms extending outwardly from opposed sides of the conduit.

7. Irrigation apparatus according to claim 6, in which the side members have peripheral rims, and in which the lateral support means have locating formations for locating them on the peripheral rims when the conduit is rolled up onto the reel.

8. Irrigation apparatus according to claim 7, in which the locating formations are provided by the arms having upper shoulder formations projecting upwardly from the free end portions of the arms when they are supporting the conduit on the ground in its operative position.

9. Irrigation apparatus according to claim 8, in which the arms have lower shoulder formations which are opposed to and are directed in the opposed direction to the upper shoulder formations, for locating successive coils of the conduit in position on the storage means when the conduit is wound onto the storage means.

10. Irrigation apparatus according to claim 4, in which the conduit has longitudinal support means at spaced intervals along its length to support the conduit longitudinally during use.

* * * * *